United States Patent
Park

[11] Patent Number: 6,118,551
[45] Date of Patent: Sep. 12, 2000

[54] TECHNIQUE FOR INFORMING CALLING PARTY OF NO-PAPER STATE DURING RECEPTION OF IMAGE DATA BY FACSIMILE MACHINE

[75] Inventor: Joo-Seung Park, Kyongsangbuk-do, Rep. of Korea

[73] Assignee: SamSung Electronics Co., Ltd., Kyungki-do, Rep. of Korea

[21] Appl. No.: 09/099,357

[22] Filed: Jun. 18, 1998

[30] Foreign Application Priority Data

Jun. 18, 1997 [KR] Rep. of Korea .................. 97-25345

[51] Int. Cl.[7] .................. H04N 1/00; H04M 11/00; B41B 15/00
[52] U.S. Cl. .................. 358/405; 358/440; 358/441; 358/1.14; 379/100.06
[58] Field of Search .................. 358/405, 434, 358/437, 439, 440, 441, 1.14; 379/100.05, 100.06, 100.14

[56] References Cited

U.S. PATENT DOCUMENTS

| | | | |
|---|---|---|---|
| 4,922,524 | 5/1990 | Baba et al. | 358/440 |
| 4,956,860 | 9/1990 | Murata | 358/440 |
| 5,127,047 | 6/1992 | Bell et al. | 358/439 |
| 5,140,439 | 8/1992 | Tanaka | 358/405 |
| 5,155,601 | 10/1992 | Toyama | 358/440 |
| 5,210,621 | 5/1993 | Kinoshita | 358/440 |
| 5,214,690 | 5/1993 | Kato et al. | 379/100.05 |
| 5,283,665 | 2/1994 | Ogata | 358/434 |
| 5,355,230 | 10/1994 | Kaneko | 358/441 |
| 5,396,342 | 3/1995 | Meyer | 358/442 |
| 5,412,710 | 5/1995 | Tanaka | 379/100.14 |
| 5,559,611 | 9/1996 | Bloomfield et al. | 358/407 |
| 5,644,404 | 7/1997 | Hashimoto et al. | 358/434 |
| 5,717,744 | 2/1998 | Yoshida et al. | 358/434 |
| 5,825,990 | 11/1996 | Heo et al. | 358/437 |

FOREIGN PATENT DOCUMENTS

| | | | |
|---|---|---|---|
| 1-251874 | 10/1989 | Japan | H04N 1/32 |
| 3-268570 | 11/1991 | Japan | H04N 1/32 |

*Primary Examiner*—Kimberly A. Williams
*Attorney, Agent, or Firm*—Robert E. Bushnell, Esq.

[57] ABSTRACT

A technique for informing a calling party of a no-paper state while a facsimile machine receives image data. If no paper is sensed while the facsimile machine receives image data, a call reservation is made. If the calling party responds to the call reservation, a voice message indicating that there is no paper is sent to the calling party.

32 Claims, 2 Drawing Sheets

TECHNIQUE FOR INFORMING CALLING PARTY OF NO-PAPER STATE DURING RECEPTION OF IMAGE DATA BY FACSIMILE MACHINE

CLAIM OF PRIORITY

This application makes reference to, incorporates the same herein, and claims all benefits accruing under 35 U.S.C. §119 from an application for METHOD FOR INFORMING CALLING PARTY OF NO-PAPER STATE DURING RECEPTION OF IMAGE DATA IN FACSIMILE earlier filed in the Korean Industrial Property Office on the 18th of May 1997 and there duly assigned Ser. No. 25345/1997.

BACKGROUND OF THE INVENTION

1. Field of the Invention

The present invention relates to a facsimile machine, and more particularly, to a technique for reporting a no-paper state to a calling party (i.e., a sender of a facsimile message) during reception of the facsimile message.

2. Description of the Related Art

A representative function of a facsimile machine is to transmit and receive documents. If a caller (i.e., a sender of a facsimile message) puts a document on a document tray and dials a telephone number for a called facsimile machine, a calling facsimile machine reads the document and performs a designated protocol to transmit image data of the facsimile message to the called facsimile machine. The called facsimile machine receives the image data according to protocol upon receiving a ring signal and prints the image data on recording paper. However, even though the called facsimile machine runs out of recording paper while receiving the image data, the calling party is not aware that the calling facsimile machine has no paper. Therefore, the sender judges this state (i.e., disconnection of the facsimile transmission) as an error in communication and repeatedly attempts to transmit the document. That is, when there is no paper while the called facsimile machine receives the image data, the calling party continues to attempt to re-transmit the document unnecessarily.

The patent to Bell et al., U.S. Pat. No. 5,127,047, entitled Facsimile Machine Having User Notification Capability, discloses a facsimile machine which determines the status of a received or transmitted facsimile message and in response thereto dials a specific telephone number and transmits a message (which may include an audio message) to notify a user of the status of the received or transmitted facsimile message.

The patent to Tanaka, U.S. Pat. No. 5,140,439, entitled Facsimile Communication Method And Facsimile Machine, discloses a facsimile communication method which determines whether a receiver facsimile machine is successful in receiving the transmitted image information and which sends a second station related to the receiver facsimile machine a second voice message from the receiver facsimile machine when the receiver facsimile machine has failed to receive the transmitted image information.

The patents to Kinoshita, and Toyama, U.S. Pat. Nos. 5,210,621 and 5,155,601, respectively Facsimile Apparatus, and Data Communication Apparatus, disclose facsimile arrangements in which the receiving facsimile machine sends a voice message to the sending facsimile machine upon successfully receiving a facsimile transmission.

Both the Bell et al. '047 and Tanaka '439 patents disclose methods for transmitting a voice message after dialing a telephone number of a calling party, thereby forming a call line in order to inform the calling party of a state (including reception error and reception failure) of a called party in response to a call. The telephone number of the calling party has been previously stored by a called party.

The present invention is distinguished from the above references in that the present invention discloses transmitting a voice message in response to a state of no paper of a called party through a call line previously formed between a calling party and the called party, using the call reservation function, without dialing a telephone number of a calling party additionally in order to inform the calling party of the no paper state of the called party in response to a call in case that a state of no paper occurs.

The call reservation function is a function which makes one party perform communication with the other party right after a transmission or reception terminates without redialing a telephone number of the other party. The call reservation function can be set in either a calling party or a called party.

The present invention discloses sending a call reservation request data through the call line previously formed to the calling party in case the no paper status occurs during transmission; and after that, a telephone communication is accomplished between the calling party and the called party when the calling party responds to the call reservation request. The called party transmits a voice message informing the calling party of no paper status and number of pages transmitted through a telephone call line.

The following additional patents each disclose features in common with the present invention but do not teach or suggest the specifically recited technique of the present invention: U.S. Pat. No. 5,355,230 to Kaneko, entitled Facsimile Apparatus And Facsimile System, U.S. Pat. No. 5,283,665 to Ogata, entitled Facsimile Apparatus, U.S. Pat. No. 5,644,404 to Hashimoto et al., entitled Facsimile Server System Capable Of Recognizing At Transmitting End An Access To Received Facsimile Data At Receiving End, U.S. Pat. No. 4,922,524 to Baba et al., entitled Facsimile System With A Voice Transmission Function, U.S. Pat. No. 5,717,744 to Yoshida et al., entitled Data Communicating Apparatus Having User Notification Capability And Method, U.S. Pat. No. 5,396,342 to Meyer, entitled Automatic Remote Facsimile Testing System, U.S. Pat. No. 4,956,860 to Murata, entitled System For Reporting Status Data In A Facsimile Network, U.S. Pat. No. 5,214,690 to Kato et al., entitled Facsimile Device, and U.S. Pat. No. 5,412,710 to Tanaka, entitled Facsimile Machine Capable Of Transmitting Voice Message.

SUMMARY OF THE INVENTION

It is therefore an object of the present invention to provide a technique for reporting a no-paper state to a sender, when a called facsimile machine runs out of paper while receiving image data.

In one aspect of the present invention, when no paper is sensed while a called facsimile machine receives image data, the called facsimile makes a call reservation to a sender. If a calling party responds to the call reservation, a voice message indicating that there is no paper is sent to the sender.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A preferred embodiment of the present invention will be described in detail hereinbelow with reference to the accompanying drawings. In the following description, numerous specific details are set forth to provide a more thorough understanding of the present invention. It will be apparent, however, to one skilled in the art that the present invention may be practiced without these specific details. In other instances, well known functions or constructions have not been described so as not to obscure the present invention.

Figure 1:
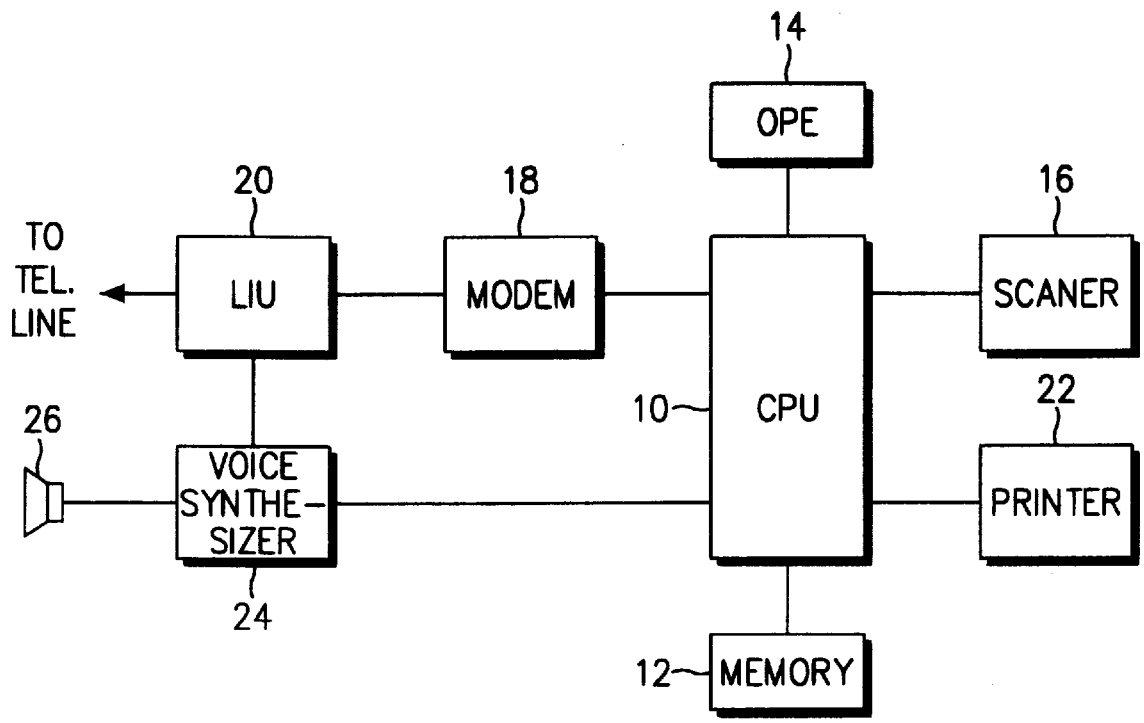
FIG. 1 is a block diagram of a facsimile machine applied to the present invention.

Referring to FIG. 1, a central processing unit (CPU) 10 controls an overall operation of a facsimile machine according to a control program stored in a memory 12. If no paper is detected while the facsimile machine is receiving image data, the CPU 10 makes a call reservation to the calling (i.e., counterpart) facsimile machine and controls a voice synthesizer 24 to send a voice message indicating a no-paper state to the calling facsimile machine. The memory 12 stores a telephone number for the other party and various information necessary for service functions and temporarily stores the number of pages received up to now upon detecting no paper. An operating panel equipment (OPE) 14 includes a display unit for displaying an operating state under the control of the CPU 10 and includes function keys and numeral keys. Key data generated from the OPE 14 is supplied to the CPU 10. A scanner 16 reads a document and supplies image data of the document to the CPU 10. A modem 18 modulates transmission data into an analog signal and demodulates received analog data under the control of the CPU 10. A line interface unit (LIU) 20 forms a communication loop of a telephone line under the control of the CPU 10 and interfaces a signal between the modem 18 and the telephone line. A printer 22 prints the image data on recording paper under the control of the CPU 10. The voice synthesizer 24 converts an incoming message received from the modem 18 into digital data and stores the digital data in the memory 12, under the control of the CPU 10. Furthermore, the voice synthesizer 24 synthesizes a voice signal for an outgoing message indicating the no-paper state and the number of pages received up to now, and outputs the synthesized voice signal through a speaker 26, under the control of the CPU 10.

Figure 2:
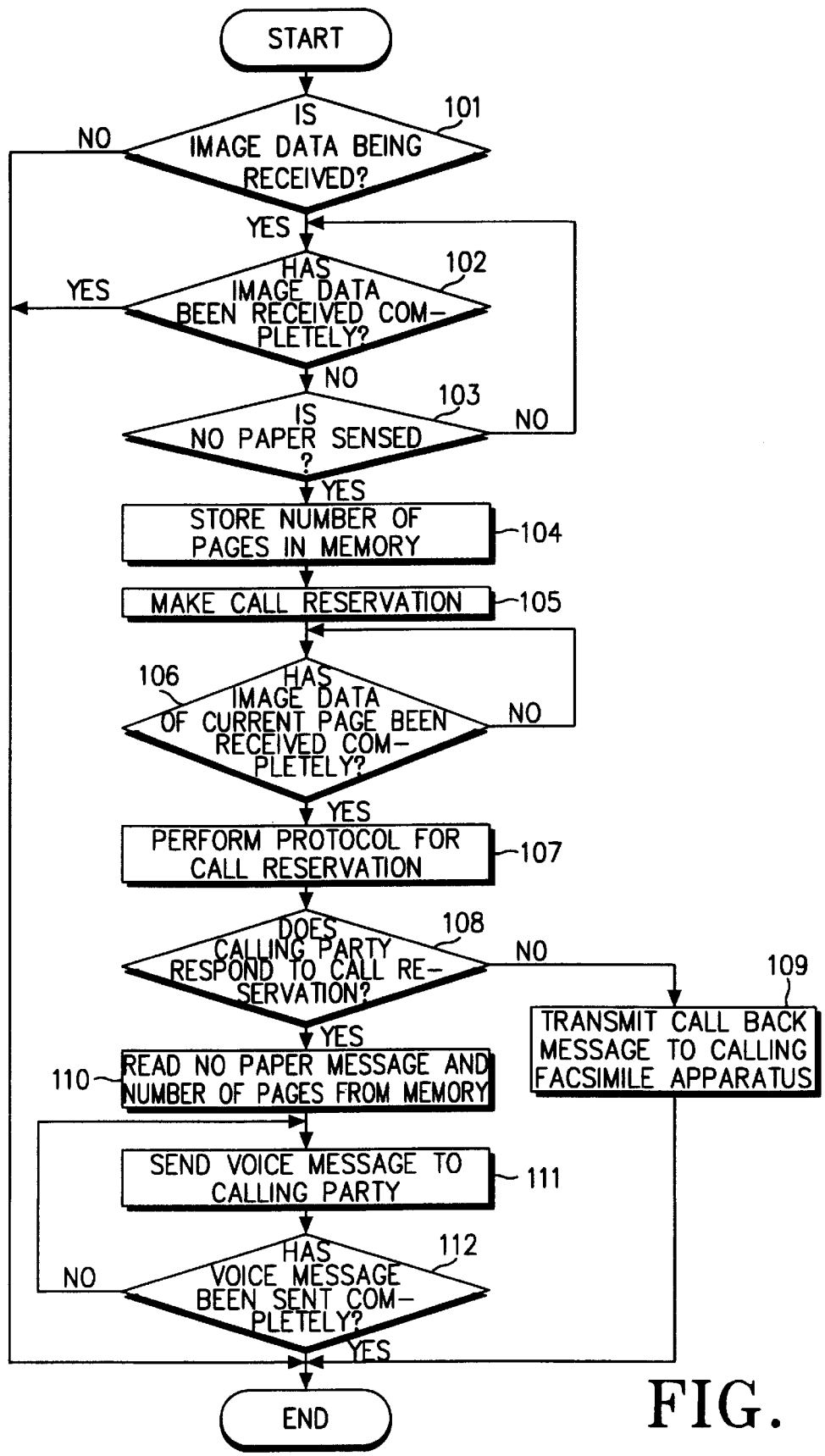
FIG. 2 is a flowchart for informing a sender of a no-paper condition, when a called facsimile machine runs out of paper while receiving image data.

FIG. 2 illustrates a control procedure for informing the sender of the no-paper state when the called facsimile machine runs out of paper while receiving image data. If no paper is sensed while the called facsimile machine receives the image data, the number of pages received until now is stored in the memory 12. Thereafter, the called facsimile machine makes the call reservation to the calling facsimile machine. If the calling facsimile machine responds to the call reservation (e.g., by on-hooking the handset), the outgoing voice message indicating the no-paper state and the number of pages received until now is sent to the calling facsimile machine.

Now, referring to FIGS. 1 and 2, the preferred embodiment of the present invention will be described in detail. The CPU 10 checks at step 101 whether the image data is being received. If not, the control procedure is completed. If the image data is being received, step 101 goes to step 102 to check whether the image data has been received completely. If so, the control is ended. If it has not been received completely, step 102 proceeds to step 103 to see if no paper is sensed by checking whether a sensing signal for sensing the paper is received by a recording paper sensor (not shown) of the printer 22. If the paper is sensed, step 103 returns to step 102 to continue to receive the image data. If no paper is sensed, step 103 goes to step 104 to store the number of pages received until now in a storage area of the memory 12. The pages received until now include a current page of the received image data. Step 104 is followed by step 105 to make a call reservation. Step 105 advances to step 106 to check whether the image data of the current page has been received completely. If it has not been received completely, the CPU 10 waits until the image data of the current page is received completely. If it has been received completely, step 106 goes to step 107 to perform protocol for the call reservation. The protocol for the call reservation is performed together with the calling facsimile machine and implemented after phase C. As to the protocol for the call reservation, call reservation request data is sent to the calling facsimile machine through protocol communication after phase C. At step 108 following the step 107, the CPU 10 checks whether the calling facsimile machine responds to the call reservation by judging whether a call reservation confirmation signal indicating acknowledgment for the call reservation is received from the calling facsimile machine. If the calling facsimile machine does not respond to the call reservation, step 108 goes to step 109 to transmit a call back message to the calling facsimile machine after the passage of a specified time. If the calling facsimile machine responds to the call reservation, step 108 proceeds to step 110 to read a no-paper message and the number of pages received until now from the memory 12. Step 110 goes to step 111 to send the synthesized voice message indicating the no-paper state and the number of pages to the calling party (i.e., sender) by controlling the voice synthesizer 24. At step 112 following step 111, whether the voice message has been sent completely is checked. If not, step 112 returns to step 111 to continue to send the voice message, and if so, the control is ended.

As mentioned above, if the recording paper is depleted while the called facsimile machine receives the image data, a voice message indicating the no-paper state is transmitted to the calling party. Therefore, the calling party can know that the called facsimile has no paper and can prevent repeated attempts to transmit the document.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. In a method for informing a calling party of a no-paper state while a called facsimile machine having a memory in which a no-paper message is stored receives image data, said method comprising the steps of:

making a call reservation when no paper is sensed while receiving the image data; and sending a voice message indicating a no-paper state to the calling party when the calling facsimile machine responds to said call reservation;

the improvement comprising a further step upon sensing no paper while receiving the image data, said further step comprising storing in a memory a pages-received number.

2. A method for informing a calling party of a no-paper state while a called facsimile machine having a memory in which a no-paper message is stored receives image data, comprising the steps of:

(1) making a call reservation when no paper is sensed while receiving the image data;

(2) sending a voice message indicating a no-paper state to the calling party when the calling facsimile machine responds to said call reservation; and (3) storing the number of pages received until now in said memory when no paper is sensed while receiving said image data.

3. The method as claimed in claim 2, said voice message comprising a message indicating that there is no paper and a message representing the number of pages received until now.

4. A method for informing a calling party of a no-paper state while a called facsimile machine having a memory in which a no-paper message is stored receives image data, comprising the steps of:

(1) making a call reservation when no paper is sensed while receiving the image data; and (2) sending a voice message indicating a no-paper state to the calling party when the calling facsimile machine responds to said call reservation, said voice message comprising a message indicating that there is no paper and a message representing the number of pages received until now.

5. The method as claimed in claim 1, said call reservation being made automatically when no paper is sensed.

6. The method as claimed in claim 5, said voice message comprising a message indicating that there is no paper and a message representing the number of pages received until now.

7. In a method for informing a calling party of a no-paper state while a called facsimile machine having a memory in which a no-paper message is stored receives image data, said method comprising the steps of:

receiving the image data;

checking whether no paper is sensed while receiving said image data;

making a call reservation when no paper is sensed;

confirming whether the calling facsimile machine responds to said call reservation; and sending a voice message indicating that there is no paper to the calling party when the calling party responds to said call reservation;

the improvement comprising a further step upon sensing no paper while receiving the image data, said further step comprising storing in a memory a pages-received number.

8. A method for informing a calling party of a no-paper state while a called facsimile machine having a memory in which a no-paper message is stored receives image data, comprising the steps of:

(1) receiving the image data;

(2) checking whether no paper is sensed while receiving said image data; and storing the number of pages received until now in said memory when no paper is sensed while receiving said image data;

(3) making a call reservation when no paper is sensed;

(4) confirming whether the calling facsimile machine responds to said call reservation; and (5) sending a voice message indicating that there is no paper to the calling party when the calling party responds to said call reservation.

9. The method as claimed in claim 8, further comprising the step of sending a call back message to the calling party when the calling party does not respond to said call reservation.

10. The method as claimed in claim 8, further comprising the step of reading said no-paper message and the number of pages received until now from said memory when the calling facsimile machine responds to said call reservation.

11. A method for informing a calling party of a no-paper state while a called facsimile machine having a memory in which a no-paper message is stored receives image data, comprising the steps of:

(1) receiving the image data;

(2) checking whether no paper is sensed while receiving said image data;

(3) making a call reservation when no paper is sensed;

(4) confirming whether the calling facsimile machine responds to said call reservation;

(5) sending a voice message indicating that there is no paper to the calling party when the calling party responds to said call reservation; and (6) sending a call back message to the calling party when the calling party does not respond to said call reservation.

12. A method for informing a calling party of a no-paper state while a called facsimile machine having a memory in which a no-paper message is stored receives image data, comprising the steps of:

(1) receiving the image data;

(2) checking whether no paper is sensed while receiving said image data;

(3) making a call reservation when no paper is sensed;

(4) confirming whether the calling facsimile machine responds to said call reservation, and reading said no-paper message and the number of pages received until now from said memory when the calling facsimile machine responds to said call reservation; and (5) sending a voice message indicating that there is no paper to the calling party when the calling party responds to said call reservation.

13. The method as claimed in claim 12, further comprising the step of sending a call back message to the calling party when the calling party does not respond to said call reservation.

14. A method for informing a calling party of a no-paper state while a called facsimile machine having a memory in which a no-paper message is stored receives image data, comprising the steps of:

checking whether there is paper while receiving image data;

storing in said memory the number of pages received until now when no paper is sensed while receiving said image data;

making a call reservation;

performing a protocol for said call reservation;

checking whether the calling party responds to said call reservation;

reading said no-paper message and the number of pages from said memory when the calling party responds to said call reservation; and sending a voice message for the no-paper message and the number of pages received until now to the calling party.

15. The method as claimed in claim 14, the step of performing said protocol being performed after the image data of a current page is received completely.

16. The method as claimed in claim 14, further comprising the step of transmitting a call back message to the calling party when the calling party does not respond to said call reservation.

17. In an apparatus for informing a calling party of a no-paper state while a called facsimile machine having a memory in which a no-paper message is stored receives image data, said apparatus comprising:

a means for making a call reservation when no paper is sensed while receiving the image data; and a means for sending a voice message indicating a no-paper state to the calling party when the calling facsimile machine responds to said call reservation;

the improvement comprising a means for storing the number of pages received until now in said memory when no paper is sensed while receiving said image data.

18. An apparatus for informing a calling party of a no-paper state while a called facsimile machine having a memory in which a no-paper message is stored receives image data, comprising:

a means for making a call reservation when no paper is sensed while receiving the image data; and a means for storing the number of pages received until now in said memory when no paper is sensed while receiving said image data; and a means for sending a voice message indicating a no-paper state to the calling party when the calling facsimile machine responds to said call reservation.

19. The apparatus as claimed in claim 18, wherein said means for sending a voice message sends a message indicating that there is no paper and a message representing the number of pages received until now.

20. The apparatus as claimed in claim 17, wherein said means for sending a voice message sends a message indicating that there is no paper and a message representing the number of pages received until now.

21. The apparatus as claimed in claim 17, said means for making a call reservation making said call reservation automatically when no paper is sensed.

22. The apparatus as claimed in claim 21, wherein said means for sending a voice message sends a message indicating that there is no paper and a message representing the number of pages received until now.

23. In an apparatus for informing a calling party of a no-paper state while a called facsimile machine having a memory in which a no-paper message is stored receives image data, said apparatus comprising:

a means for receiving the image data;

a means for checking whether no paper is sensed while receiving said image data;

a means for making a call reservation when no paper is sensed;

a means for confirming whether the calling facsimile machine responds to said call reservation; and a means for sending a voice message indicating that there is no paper to the calling party when the calling party responds to said call reservation;

the improvement comprising: a means for storing the number of pages received until now in said memory when no paper is sensed while receiving said image data.

24. An apparatus for informing a calling party of a no-paper state while a called facsimile machine having a memory in which a no-paper message is stored receives image data, comprising:

a means for receiving the image data;

a means for checking whether no paper is sensed while receiving said image data;

a means for storing the number of pages received until now in said memory when no paper is sensed while receiving said image data;

a means for making a call reservation when no paper is sensed;

a means for confirming whether the calling facsimile machine responds to said call reservation;

a means for sending a voice message indicating that there is no paper to the calling party when the calling party responds to said call reservation.

25. The apparatus as claimed in claim 24, further comprising a means for sending a call back message to the calling party when the calling party does not respond to said call reservation.

26. The apparatus as claimed in claim 24, further comprising a means for reading said no-paper message and the number of pages received until now from said memory when the calling facsimile machine responds to said call reservation.

27. An apparatus for informing a calling party of a no-paper state while a called facsimile machine having a memory in which a no-paper message is stored receives image data, comprising:

a means for receiving the image data;

a means for checking whether no paper is sensed while receiving said image data;

a means for making a call reservation when no paper is sensed;

a means for confirming whether the calling facsimile machine responds to said call reservation;

a means for sending a voice message indicating that there is no paper to the calling party when the calling party responds to said call reservation; and a means for sending a call back message to the calling party when the calling party does not respond to said call reservation.

28. An apparatus for informing a calling party of a no-paper state while a called facsimile machine having a memory in which a no-paper message is stored receives image data, comprising:

a means for receiving the image data;

a means for checking whether no paper is sensed while receiving said image data;

a means for making a call reservation when no paper is sensed;

a means for confirming whether the calling facsimile machine responds to said call reservation;

a means for reading said no-paper message and the number of pages received until now from said memory when the calling facsimile machine responds to said call reservation; and a means for sending a voice message indicating that there is no paper to the calling party when the calling party responds to said call reservation.

29. The apparatus as claimed in claim 28, further comprising a means for sending a call back message to the calling party when the calling party does not respond to said call reservation.

30. Apparatus for informing a calling party of a no-paper state while a called facsimile machine having a memory in which a no-paper message is stored receives image data, comprising:

- a means for checking whether there is paper while receiving image data;
- a means for storing in said memory the number of pages received until now when no paper is sensed while receiving said image data;
- a means for making a call reservation;
- a means for performing a protocol for said call reservation;
- a means for checking whether the calling party responds to said call reservation;
- a means for reading said no-paper message and the number of pages from said memory when the calling party responds to said call reservation; and
- a means for sending a voice message for the no-paper message and the number of pages received until now to the calling party.

31. The apparatus as claimed in claim 30, the means for performing said protocol performing said protocol after the image data of a current page is received completely.

32. The apparatus as claimed in claim 30, further comprising a means for transmitting a call back message to the calling party when the calling party does not respond to said call reservation.

* * * * *